United States Patent Office.

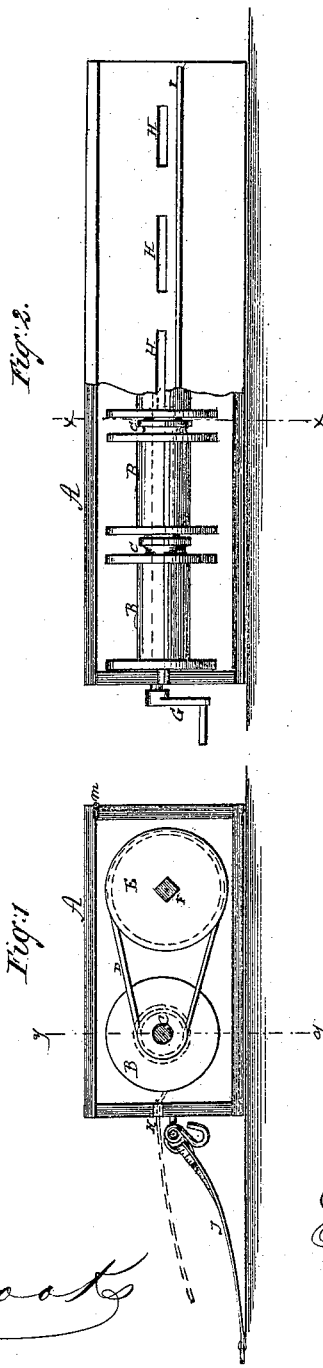

GEORGE F. WOOLSTON, OF MARSHALLTOWN, IOWA.

Letters Patent No. 96,530, dated November 2, 1869.

IMPROVED RIBBON-CASE.

The Schedule referred to in these Letters Patent and making part of the same.

*To all whom it may concern:*

Be it known that I, GEORGE F. WOOLSTON, of Marshalltown, in the county of Marshall, and State of Iowa, have invented a new and useful Improvement in Ribbon-Case; and I do hereby declare that the following is a full, clear, and exact description thereof, which will enable others skilled in the art to make and use the same, reference being had to the accompanying drawings, forming part of this specification.

The object of this invention is to provide a safe and convenient method of keeping ribbons for retail, and for measuring the same as they are sold, the arrangement being more especially designed for velvet and other expensive ribbons, but applicable to all ribbons, as well as laces, and other narrow goods; and The invention consists in arranging, in a box or case of suitable size, spools of various widths, to suit the different widths of ribbon sold, and providing each spool with a pulley, and with an adjustable driving-pulley, on a shaft passing through the case, as will be hereinafter more fully described.

In the accompanying drawing—

Figure 1 is a vertical cross-section of fig. 2, through the line $x\ x$, showing the position of the spools, and of the driving-pulley, by means of which the spools are revolved.

Figure 2 is a front view of the case, partly in section, as through the line $y\ y$ of fig. 1, showing a portion of the spools, and the slots through which the ribbons are drawn, when they are measured.

Similar letters of reference indicate corresponding parts.

A represents the case, which is rectangular in form, and of any desired length and breadth.

B represents the spools, which may be more or less in number, and of various widths.

Each spool has a small pulley, $c$, on its end on which the band D works from the driving-pulley E.

The spool revolves on a round rod, which is stationary. The driving-pulley is on a square shaft, F, which has journals, and revolves in the ends of the case.

One end of this shaft passes through the case, with a crank, G, upon it, as seen in fig. 2.

The ribbons are wound upon the spools by revolving the shaft F, with the band D arranged on the driving-pulley, and on one of the pulleys C, as represented.

The driving-pulley E is fitted loosely on the square shaft F, so that it can be readily moved from one spool to another.

The ribbon, in being retailed or sold from the spools, is drawn through the slots H, in the front of the case, one of which is opposite each spool.

In front of the case a wire, I, extends, to which a tape-line, J, is attached by a ring, so that it may be used for any one of the spools.

K represents the cover of the case, which is hinged, as seen at $m$. By raising this cover, the ribbons are all exposed to view.

Each of the slots H is numbered, to indicate the different widths of ribbon.

The advantages of this arrangement will be readily understood by merchants, and all others acquainted with the subject.

Having thus described my invention,

I claim as new, and desire to secure by Letters Patent—

The spools B, with the pulleys C, the adjustable driving-pulley E, on the shaft F, and the band D, in combination with the case A, constructed, arranged, and operating as and for the purposes described.

GEO. F. WOOLSTON.

Witnesses:
F. P. PARKER,
E. C. RICE.